(12) United States Patent
Matsubara et al.

(10) Patent No.: US 10,994,664 B2
(45) Date of Patent: May 4, 2021

(54) HOLDING APPARATUS AND METHOD OF FIXING MOUNTING STAND FOR USE IN VEHICLE TEST

(71) Applicant: HORIBA, LTD., Kyoto (JP)

(72) Inventors: Yoshiaki Matsubara, Kyoto (JP); Kazuki Furukawa, Kyoto (JP)

(73) Assignee: HORIBA, LTD., Kyoto (JP)

( * ) Notice: Subject to any disclaimer, the term of this patent is extended or adjusted under 35 U.S.C. 154(b) by 38 days.

(21) Appl. No.: 16/457,145

(22) Filed: Jun. 28, 2019

(65) Prior Publication Data
US 2020/0189483 A1 Jun. 18, 2020

(30) Foreign Application Priority Data
Dec. 12, 2018 (JP) .............................. JP2018-232931

(51) Int. Cl.
```
B60R 11/02      (2006.01)
G01M 15/10      (2006.01)
G01M 17/00      (2006.01)
G05D 1/02       (2020.01)
G07C 5/02       (2006.01)
G01M 17/007     (2006.01)
B60R 11/00      (2006.01)
```

(52) U.S. Cl.
CPC ........... *B60R 11/02* (2013.01); *G01M 15/102* (2013.01); *G01M 17/007* (2013.01); *B60R 2011/0012* (2013.01); *B60R 2011/0059* (2013.01); *G05D 1/021* (2013.01); *G07C 5/02* (2013.01)

(58) Field of Classification Search
CPC ... G01M 17/007; G01M 15/102; B60R 11/02; B60R 2011/0012; B60R 2011/0059; B60N 2002/905; G05D 1/021; G07C 5/02
See application file for complete search history.

(56) References Cited

U.S. PATENT DOCUMENTS 6,767,055 B1 * 7/2004 Sparks ................... B60N 2/162
297/216.13

FOREIGN PATENT DOCUMENTS

| CN | 106153321 A | 11/2016 | |
| JP | 2003-149087 A | 5/2003 | |
| JP | 2003149087 A * | 5/2003 | .......... G01M 17/007 |

OTHER PUBLICATIONS

JP2003149087; Ogawa et al.; A Method for Fixing Robot for Automatically Driving Motor Vehicle; Dec. 4, 2020; pp. 1-4 (Year: 2020).*
EESR dated Jan. 27, 2020 issued for European Patent Application No. EP19183908.3, 8 pgs.
"Regulation No. 14 of the Economic Commission for Europe of the United Nations (UN/ECE)—Uniform provisions concerning the approval of vehicles with regard to safety-belt anchorages, Isofix anchorages systems and Isofix top-tether anchorages", Official Journal of the European Union, Apr. 28, 2011, http://www.unece.org/trans/main/wp29/wp29wgs/wp29gen/wp29fdocstts.html, 45 pgs.

* cited by examiner

*Primary Examiner* — Bayan Salone
(74) *Attorney, Agent, or Firm* — Brooks Kushman P.C.

(57) ABSTRACT

A holding apparatus is adapted for holding a vehicle test device to be used for testing a test sample that is a vehicle or a part of the vehicle on a seat of the test sample, and includes: a mounting stand on which the vehicle test device is mounted; and a fixing a mechanism configured to be connected to an ISOFIX anchor provided in the test sample to fix the mounting stand to the seat.

10 Claims, 5 Drawing Sheets

HOLDING APPARATUS AND METHOD OF FIXING MOUNTING STAND FOR USE IN VEHICLE TEST

CROSS-REFERENCE TO RELATED APPLICATION

This application claims priority to Japanese Application No. 2018-232931, filed Dec. 12, 2018, the disclosure of which is incorporated in its entirety by reference herein.

TECHNICAL FIELD

The present disclosure relates to a holding apparatus for holding, on a seat of a vehicle, a vehicle test device to be subjected to a test of the vehicle, and a method for fixing a mount stand included in the holding apparatus.

BACKGROUND ART

In the case where a performance test of a vehicle is carried out using a chassis dynamometer, a vehicle test device such as an automatic driving robot is mounted on a driver's seat, and a driving operation of the vehicle is performed in some case. In this case, in order to stabilize a position and posture of the vehicle test device on the driver's seat having cushioning properties, a mounting stand is installed, and fixed on the driver's seat, and the vehicle test device is mounted and held on the mounting stand.

As a method for fixing such a mounting stand to a driver's seat, there is known a method, for example, as disclosed in Patent Literature 1, one end of a belt having its length adjustable is connected to the mounting stand and the other end is connected to a part of a vehicle such as a bar provided under the driver's seat. In this state, by tightening the belt, the mounting stand is pulled downward and brought into close contact with a seating surface of the driver's seat and fixed.

CITATION LIST

Patent Literatures

Patent Literature 1: Japanese Unexamined Patent Application Publication No. 2003-149087

SUMMARY OF INVENTION

Technical Problem

However, although the above-described conventional fixing method allows the mounting stand to be brought into close contact with a seating surface of the driver's seat and fixed thereto in a vertical direction, it is not securely fixed in a front-back direction of the seat. Therefore, there is a risk that a position of the mounting stand may be shifted or tilted back and forth due to such as a pedal depression operation of the automatic driving robot. In addition, there is also a problem that vehicle parts such as bars provided under the driver's seat are not expected to be heavily loaded, and parts may be damaged if the belt is tightened too tightly, and the belt cannot be tightened with a strong force.

In addition to connection to vehicle parts under the driver's seat, by connecting the mounting stand also to the backrest part of the driver's seat using a belt, it becomes possible to securely fix the mounting stand to the driver's seat. However, since the positions where the belt is connected are increased, the work of fixing the mounting stand becomes complicated and the working time increases. Moreover, since a structure under the driver's seat and a shape of the backrest part of the driver's seat differ depending on vehicle types, it is necessary to find a position where the belt can be connected so that the mounting stand can be fixed securely every time a type of a vehicle to be subjected to a test is changed. This is a factor that makes the fixing operation complicated and increases the operation time.

Therefore, the embodiment of the present invention has been made, and a main object thereof is to fix a mounting stand on which a vehicle test device to be used for testing a test sample that is a vehicle or a part of the vehicle is securely fixed to a seat with a simple work.

Solution to Problem

That is, a holding apparatus according to one embodiment of the present invention is adapted for holding a vehicle test device to be used for testing a test sample that is a vehicle or a part of the vehicle on a seat of the test sample, and the holding apparatus includes: a mounting stand on which the vehicle test device is mounted; and a fixing mechanism configured to be connected to an ISOFIX anchor provided in the test sample to fix the mounting stand to the seat.

According to the embodiment of the present invention having a configuration like this, since the mounting stand can be fixed to the seat using the ISOFIX anchor provided in the test sample such as the vehicle, the mounting stand on which the vehicle test device is mounted can be securely fixed to the seat with a simple work.

That is, regarding the ISOFIX anchor conforming to ISOFIX, which is an international standard of a type of fixing a child seat to a vehicle seat, or conforming to a standard corresponding thereto, since the installation position thereof in the vehicle is predetermined regardless of types of vehicles, even in the case where the test sample to be subjected to a test is changed, an operator performing a vehicle test can easily find out a connection position of the fixing mechanism, and the mounting stand can be fixed to the seat pith a simple work.

Further, since the ISOFIX anchor is formed of a member assumed to be subjected to a large load, there is little possibility of breakage even in the case where the mounting stand and the ISOFIX anchor are connected by, for example, a belt and the belt is fastened with large force. Therefore, in the case where the mounting stand and the ISOFIX anchor are connected via, for example, a belt or the like, the belt can be fastened with strong force without considering breakage of the ISOFIX anchor and the mounting stand can be securely fixed to the seat.

In a configuration of the holding apparatus, it is preferable that the fixing mechanism includes an extensible mechanism having its length adjustable, and one end of the extensible mechanism is connected to the mounting stand, and the other end is connectable to the ISOFIX anchor.

According to such a configuration, by connecting the other end of the extensible mechanism to the ISOFIX anchor and adjusting the length of the extensible mechanism (specifically reducing the length) to be subjected to tension, the mounting stand can be fixed to the seat easier.

In the holding apparatus described above, it is preferable that the mounting stand has a bottom surface for contacting with a seating surface of the seat and a back surface for contacting with a backrest surface of the seat, and that the bottom surface and the back surface are configured to be respectively in surface contact with the seating surface and the backrest surface of the seat.

According to such a configuration, since the bottom surface and the back surface come into surface contact with the seating surface and the backrest surface, respectively, it becomes possible to increase a contact area and to fix the mounting stand to the driver's seat more securely.

In this holding apparatus, it is preferable that the mounting stand may further include a joint part that joints the bottom surface and the back surface, and upon fixing the joint part to the ISOFIX anchor via the extensible mechanism, the bottom surface of the mounting stand is pressed against the seating surface of the seat and the back surface of the mounting stand is pressed against the backrest surface of the seat.

In such a configuration, by fixing the extensible mechanism to the ISOFIX anchor, the bottom surface and the back surface of the mounting stand can be pressed at once to the seating surface and the backrest surface of the seat, respectively. Therefore, the mounting stand can lie securely brought into close contact with and fixed to the seat easily.

In this aspect, it is preferable to configure such that, in a state that the mounting stand is set on the seat, the joint part to which one end of the extensible mechanism is connected is positioned forward of side support portions provided on both sides of the backrest part of the seat.

In such a configuration, since the joint part is positioned forward of the side support portions of the backrest part, upon pulling the joint part by the extensible mechanism, it is possible to surely pull the joint part in an obliquely downward and backward direction of seat. Therefore, it is possible to prevent the mounting stand from being pulled obliquely upward and forward and floated up from the seat, and the mounting stand can be brought into close contact with and fixed to the seat more securely.

As a specific aspect of the vehicle test device, there may be exemplified an automatic driving device that automatically drives the test sample or an exhaust gas analyzer that analyzes exhaust gas discharged from the test sample.

It is preferable that the holding apparatus is configured to hold the vehicle test device on the driver's seat or a front passenger seat of the test sample, and the fixing mechanism is configured to being connected to the ISOFIX anchor provided on the rear seat of the test sample to fix the mounting stand to the driver's seat or the front passenger seat.

In such a configuration, the effect of the embodiment of the present invention can be made more remarkable.

Further, a holding apparatus according to another embodiment of the present invention is adapted for holding a vehicle test device to be used for testing a test sample that is a vehicle or a part of the vehicle, on a seat of the test sample, and the holding apparatus includes: a mounting stand on which the vehicle test device is mounted; and a fixing mechanism for fixing the mounting stand to the seat. In this configuration, the mounting stand includes: a bottom surface for contacting with a seating surface of the seat; a back surface for contacting with a backrest surface of the seat; and a joint part jointing the bottom surface and the back surface, and the fixing mechanism pulls the joint part in an obliquely downward and backward direction of the seat, so that the bottom surface is pressed against the seating surface and the back surface is pressed against the backrest surface to fix the mounting stand to the seat.

According to such a configuration, since the fixing mechanism can pull the joint part of the mounting stand obliquely lower backward direction of the seat, the bottom surface and the back surface can be brought into close contact with the seating surface and the backrest surface, respectively, at once, and the mounting stand can be fixed to the seat. Therefore, the mounting stand on which the vehicle test device is mounted can be securely fixed to the seat by a simple work. That is, it is not necessary to pull the mounting stand separately in the downward and the backward directions of the seat, respectively; it is sufficient to pull the mounting stand only in one direction, i.e., in an obliquely downward and backward direction. Therefore, the connection points of the fixing mechanism to the test sample can be reduced and the mounting stand can be fixed to the seat by a simple work.

Further, since not only the bottom surface of the mounting stand is brought into close contact with the seating surface of the seat, but also the back surface of the mounting stand is brought into close contact with the backrest surface of the seat, the contact area between the mounting stand and the seat is increased, and the mounting stand can be securely fixed to the seat.

Further, one aspect of the present invention is directed to a method for fixing, to a seat of a test sample that is a vehicle or a part of the vehicle, a mounting stand on which a vehicle test device to be used for testing the sample is mounted, characterized by fixing the mounting stand to the seat using an ISOFIX anchor provided in the test sample.

Further, another aspect of the present invention is directed to a method for fixing, to a seat of a test sample that is a vehicle or a part of the vehicle, a mounting stand on which a vehicle test device to be used for testing the test sample is mounted, and the mounting stand includes: a bottom surface for contacting with a seating surface of the seat of the test sample; a back surface for contacting with a backrest surface of the seat; and a joint par jointing the bottom surface and the back surface. The method is characterized by pulling the joint part in an obliquely downward and backward direction of the seat, thereby pressing the bottom surface against the seating surface and pressing the back surface against the backrest surface to fix the mounting stand to the seat.

According to the above methods for fixing the mounting stands, there can be obtained an effect similar to the holding apparatus described above.

In the method for fixing the mounting stand described above, it is preferable that the mounting stand disposed on a driver's seat or a front passenger seat of the test sample is fixed to the driver's seat or the front passenger seat using the ISOFIX anchor provided on a rear seat of the test sample.

Further, in the method for fixing the mounting stand described above, it is preferable that the mounting stand is fixed to the seat in a state that an angle formed by the seating surface of the seat and the backrest surface is equal to or smaller than an angle formed by the bottom surface and the back surface of the mounting stand. In such a configuration, as a force to fix the mounting stand to the seat is strengthened, the contact area between the backrest surface of the seat and the back surface of the mounting stand increases because of cushioning property of the seat, and the mounting stand can be fixed to the driver's seat more securely.

Advantageous Effects of Invention

According to the embodiment of the present invention configured as described above, the mounting stand on which the vehicle test device to be used for testing a test sample that is a vehicle or a part of the vehicle can be securely fixed to the seat by a simple work.

DESCRIPTION OF EMBODIMENTS

Hereinafter, a vehicle test system S including a holding apparatus 100 according to an embodiment of the present invention will be described with reference to the drawings. In the following, a specific aspect of a test sample is described as a completed vehicle.

Figure 1:
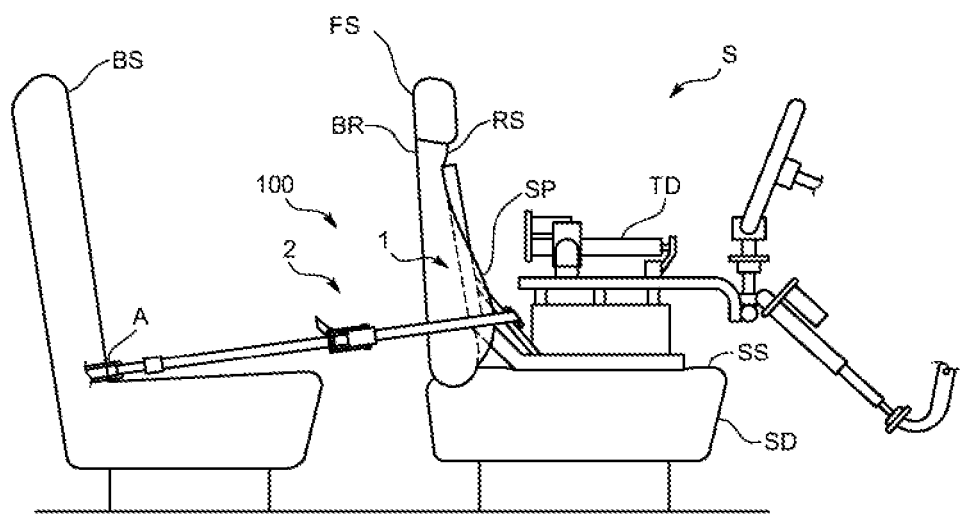
FIG. 1 is a plan view schematically showing an overall configuration of a vehicle test system according to an embodiment of the present invention.

The vehicle test system S of the present embodiment is used for a performance test of a vehicle using, for example, a chassis dynamometer, and in specific, the vehicle test system S is installed in the vehicle for automatically driving the vehicle. More specifically, as shown in FIG. 1, the vehicle test system S includes a vehicle test device TD for automatically driving the vehicle on a front seat (specifically, a driver's seat) FS and a holding apparatus 100 for holding the vehicle test device TD on the driver's seat FS. Note that the vehicle having the vehicle test system S of the present embodiment is provided with a so-called ISOFIX anchor A on a rear seat BS. Here, the ISOFIX anchor A is conforming to ISOFIX, which is an international standard of a type of fixing a child seat to a vehicle seat, or conforming to a standard corresponding thereto. This ISOFIX anchor A may be also said to be a child seat fixing portion for fixing a child seat conforming to ISOFIX.

The vehicle test device TD is an automatic driving device provided with, for example, an automatic driving robot, etc., and is configured to includes various kinds of actuators to perform depression operations of an accelerator pedal and a brake pedal, handle operation, gear change operation, and the like.

The holding apparatus 100 is fixed to the driver's seat FS of the vehicle and holds the vehicle test device TD. Specifically, as shown in FIG. 1, the holding apparatus 100 includes a mounting stand 1 which is installed in the driver's seat FS and on which the vehicle test device TD is mounted, and further includes a fixing mechanism 2 for closely attaching and fixing the mounting stand 1 to the driver's seat FS.

Figure 2:
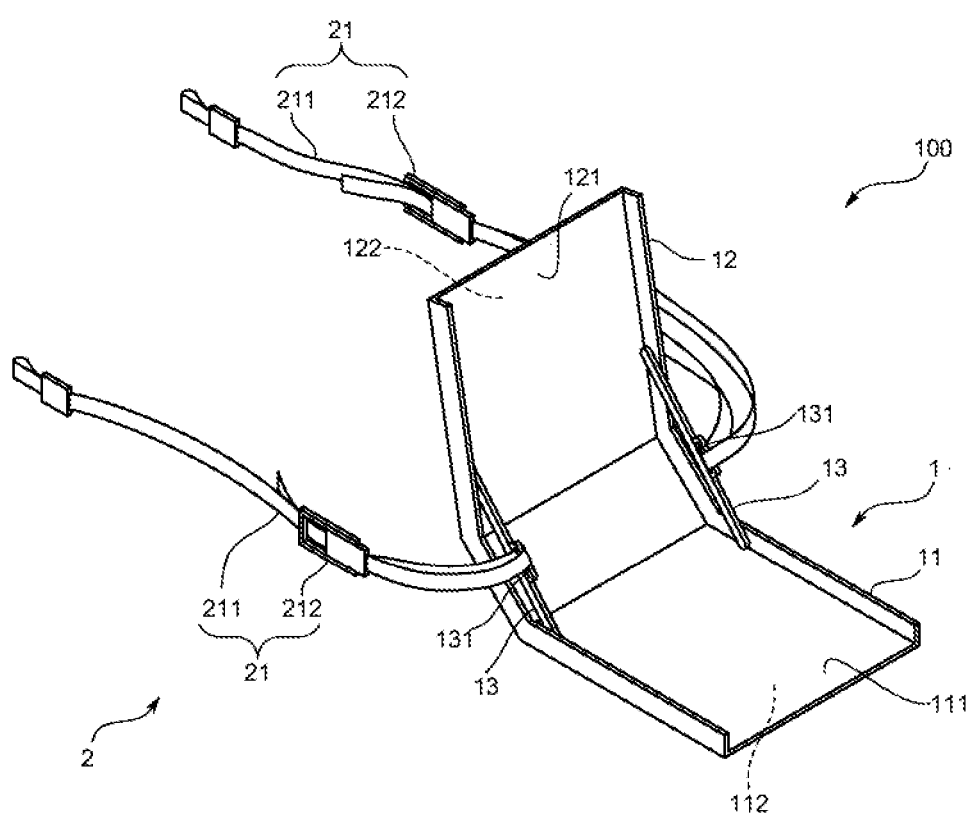
FIG. 2 is a perspective view schematically showing an entire configuration of a holding apparatus in the same embodiment.

As shown in FIGS. 1 and 2, the mounting stand 1 is mounted on a seating part SD of the driver's seat FS, and it includes a mounting part 11 on which the vehicle test device TD is mounted, and further includes a back part 12 which is in contact with a backrest part BR of the driver's seat FS. The mounting part 11 and the back part 12 of the mounting stand 1 are both substantially plate-shaped and are jointed to each other so as to form a substantially L shape. In specific, the mounting part 11 and the back part 12 of the mounting stand 1 are brought into contact with the seating part SD and the backrest part BR of the driver's seat FS, respectively.

The mounting part 11 has a mounting surface 111 on which the vehicle test device TD is mounted, and a bottom surface formed on a back side of the mounting surface 111 and in contact with a seating surface SS of the seating part SD. Here, the bottom surface 112 is formed to be planar and configured to be in surface contact with the seating surface SS. Although the mounting surface 111 is also formed to be planar like the bottom surface 112, it is not limited to this, and the shape of the mounting surface 111 may be changed as necessary in accordance with the shape of the bottom surface 112 of the vehicle test device TD.

The back part 12 has a front surface 121 facing frontward of the vehicle, and a back surface 122 formed on a back side of the front surface 121 and in contact with a backrest surface RS of the backrest part BR. Here, the back surface 122 is formed to be planar, and is configured to be in surface contact with the backrest surface RS. Although the front surface 121 is formed to be planar like the back surface 122, it is not limited to this, and the shape thereof may be changed as necessary.

The mounting stand 1 further includes a pair of left and right joint parts 13 jointing the bottom surface 112 and the back surface 122. Each joint part 13 is a member provided from the mounting surface 111 of the mounting part 11 to the front surface 121 of the back part 12 as viewed from a lateral direction (direction parallel to the bottom surface 112 and the back surface 122). In specific, one end of each joint part 13 is joined to a side of the mounting surface 111, and the other end is joined to a side of the front surface 121. Thus, the bottom surface 112 and the back surface 122 are jointed via the joint parts 13. Each joint part 13 is formed with a connection portion 131 to which one end of the fixing mechanism 2 is connected. The connection portion 131 is formed to be, for example, a through hole penetrating the joint part 13 in the lateral direction, but it is not limited to this. In addition, the joint part 13 may be integrally configured with the mounting part 11 and the back part 12, but it may be formed as a separate body therefrom.

Figure 3:
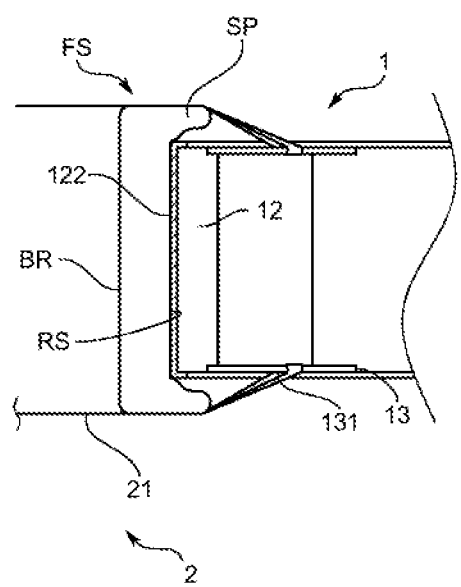
FIG. 3 is a schematic view of a driver's seat according to the same embodiment as viewed from above, illustrating a positional relationship between a joint part of the holding apparatus and a side support portion of the driver's seat.

Specifically, the connection portion 131 of each joint part 13 is provided so as to be positioned forward of the front surface 121 of the back part 12 and above the mounting surface lll of the mounting part 11 when viewed from the lateral direction. More specifically, as shown in FIGS. 1 and 3, each joint part 13 is provided so as to be positioned forward of a front end of each of side support portions SP provided on both sides of the backrest part BR of the driver's seat FS in a state that the mounting stand 1 is installed on the driver's seat FS.

The fixing mechanism 2 is configured to press and fix the mounting stand 1 to the driver's seat FS by pulling the mounting stand 1 rearward of the driver's seat FS. Specifically, as shown in FIGS. 1 and 2, the fixing mechanism 2 includes a string-like extensible mechanism 21 capable of adjusting its length. In the present embodiment, the fixing mechanism 2 includes a pair of left and right (i.e., two) extensible mechanisms 21. In the following, only one extensible mechanism 21 is described, and the description of the other extensible mechanism 21 is abbreviated.

Specifically, the extensible mechanism 21 includes a string-like body 211 and a fastening tool 212 that pulls and fastens the string-like body 211. The string-like body 211 is a packing belt or the like which is configured such that one end thereof is connected to the joint part 13 (specifically, the connection portion 131) and the other end can be connected to a member provided behind the driver's seat FS. The fastening tool 212 is, for example, of a ratchet type, which is attached to the string-like body 211 to allow the string-like body 211 to move in a contract direction and restrict to move in the extending direction. Note that the string-like body 211 is not limited to the packing belt, but may be a load chain, a wire, a rope, a string or the like.

Thus, the holding apparatus 100 of the present embodiment is configured such that the fixing mechanism 2 is configured to be connected to the ISOFIX anchor A provided on a rear seat BS of the vehicle to fix the mounting stand 1 to the driver's seat FS. Further, the holding apparatus 100 is configured such that the fixing mechanism 2 pulls the joint part 13 of the mounting stand 1 in an obliquely downward and backward direction of the driver's seat FS to bring the bottom surface 112 into close contact with the seating surface SS and the back surface 122 into close contact with the backrest surface RS at once to thereby fix the mounting stand 1 to the driver's seat FS.

Figure 4:
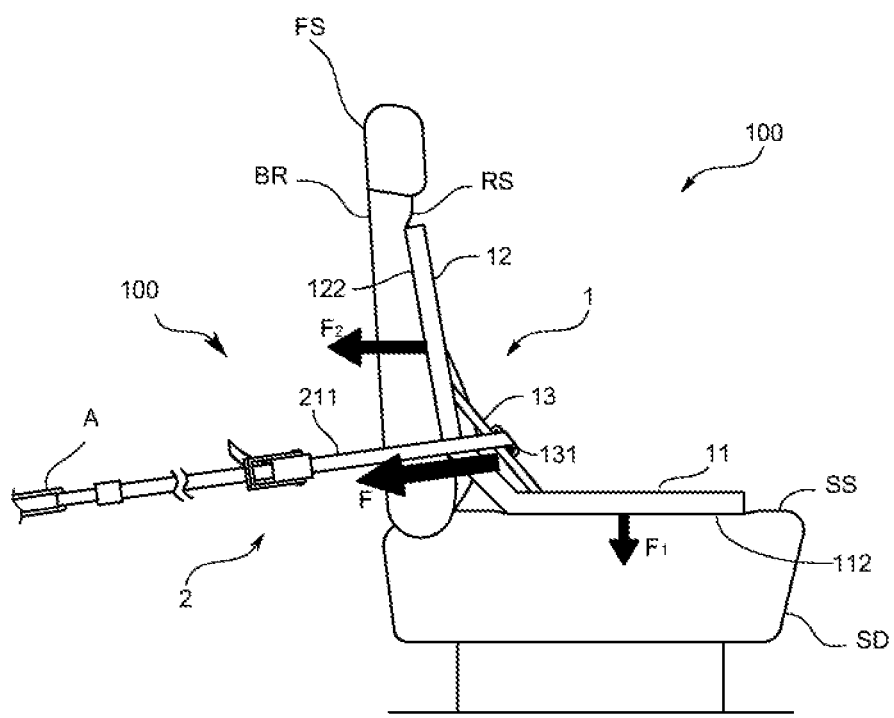
FIG. 4 is a view for explaining a state of fixing a mounting stand to a seat in the same embodiment.

Specifically, the string-like body 211 of the fixing mechanism 2 is configured such that one end thereof is connected to the connection portion 131 of the joint part 13 and the other end is connectable to the ISOFIX anchor A (i.e., a low anchorage) provided in a vicinity of a boundary between a seating surface SS and a backrest surface RS of the rear seat BS of the vehicle. Thus, the connection portion 131 is provided in the joint part 13 so as to be positioned above the ISOFIX anchor A when viewed from the lateral direction in a state that the mounting stand 1 is installed on the driver's seat FS. Therefore, in a state that one end of the string-like body 211 is connected to the joint part 13 and the other end is connected to the ISOFIX anchor A, in the case where the string-like body 211 is fastened by the fastening tool 212 while applying tension, the joint part 13 of the mounting stand 1 is pulled by a force F in the obliquely downward and backward direction as shown in FIG. 4. By this tensile force F, the joint part 13 becomes to press the mounting part 11 and the back part 12 from a side of the front surface 121 and a side of the mounting surface 111. The tensile force F in the obliquely downward and backward direction is decomposed into a downward force $F_1$ and a backward force and the bottom surface 112 is pressed against the seating surface SS by the force $F_1$, and the back surface 122 is pressed against the backrest surface RS by the force $F_2$. Note that the two extensible mechanisms 21 included in the fixing mechanism 2 are connected to the pair of left and right ISOFIX anchors A respectively, which are provided on the rear seat 135 of the vehicle.

In this configuration, an angle of the backrest part BR of the driver's seat FS is adjusted, and an angle formed between the seating surface SS and the backrest surface KS of the driver's seat FS in a state that the mounting stand 1 is not installed on the driver's seat FS becomes to be equal to or smaller than an angle formed between the bottom surface 112 and the back surface 122 of the mounting stand 1. Under this condition, in the case where the mounting stand 1 is pulled in an obliquely downward and backward direction and fixed to the driver's seat FS by the fixing mechanism 2, a contact area between the back surface 122 and the backrest surface RS increases as the tensile force F is increased, and it becomes possible to fix the mounting stand 1 to the driver's seat FS more securely.

According to the holding apparatus 100 of the present embodiment configured as described above, the mounting stand 1 is fixed to the driver's seat FS using the ISOFIX anchors A provided in the vehicle, and the fixing mechanism 2 pulls the mounting stand 1 in the obliquely downward and backward direction of the driver's seat FS. Thus, the bottom surface 112 is pressed against the seating surface SS, and the back surface 122 is pressed against the backrest surface RS so as to be brought into close contact therewith at once, and the mounting stand 1 can be fixed to the driver's seat FS. Therefore, the mounting stand 1 on which the vehicle test device TD is mounted can be fixed to the driver's seat FS securely by an extremely simple work and with strong force.

In other words, regarding the ISOFIX anchor A conforming to ISOFIX, which is an international standard of a type of fixing a child seat to a vehicle seat, the installation position thereof in the vehicle is fixed regardless of the vehicle type. Therefore, even in the case where the type of the test vehicle is changed, an operator conducting the vehicle test can easily find out the fixed position of the mounting stand 1. Furthermore, it is not necessary to separately pull the mounting stand 1 respectively in the downward direction and the backward direction of the driver's seat FS, but it is sufficient to pull only in one direction, i.e., in the obliquely downward and backward direction of the driver's seat FS. Therefore, connecting points of the fixing mechanism 2 and the mounting stand 1 can be reduced. For this reason, the mounting stand 1 can be fixed to the driver's seat FS by an extremely simple work.

Also, since the ISOFIX anchor A is a member that is expected to be applied with a large load and there is little risk of breakage even if the packing belt (i.e., string-like body) 211 is fastened by applying large force, the belt 211 can be strongly fastened by the fastening tool 212 of a ratchet type without being afraid of breakage of the ISOFIX anchor A. Further, since not only the bottom surface 112 and the seating surface SS are bought into close contact, but also the back surface 122 and the backrest surface RS are brought into close contact at once, the contact area between the mounting stand 1 and the driver's seat FS can be increased. As a result, the mounting stand 1 can be securely fixed to the driver's seat FS with strong force.

In addition, the present invention is not limited to the above embodiment.

In the above embodiment, the fixing mechanism 2 is connected to the ISOFIX anchor A, and pulls the mounting stand 1 in the obliquely downward and backward direction of the driver's seat FS, so that the bottom surface 112 is brought into close contact with the seating surface SS and the back surface 122 is brought into close contact with the backrest surface RS at once to thereby fix the mounting stand 1 to the driver's seat FS. But the configuration of the fixing mechanism 2 is not limited to this.

According to another embodiment, the fixing mechanism 2 may be configured such that the direction of pulling the mounting stand 1 by the fixing mechanism 2 is not limited so long as one end of the fixing mechanism 2 is connected to the ISOFIX anchor A to fix the mounting stand 1 to the driver's seat FS. For example, the fixing mechanism 2 may be configured to pull the mounting stand 1 only rearward of the driver's seat FS. Even in such a configuration, by fixing the mounting stand 1 using the ISOFIX anchor A, the mounting stand 1 can be securely fixed to the driver's seat FS in a short time.

According to further another embodiment, the fixing mechanism 2 may not be connected to the ISOFIX anchor A so long as the mounting stand 1 is pulled in the obliquely downward and backward direction of the driver's seat FS to bring the bottom surface 112 into close contact with the seating surface SS and the hack surface 122 into close contact with the backrest surface RS at once to thereby fix the mounting stand 1 to the driver's seat FS. For example, the other end of the string-like body 211 provided in the fixing mechanism 2 may be connected to any component such as a seat belt buckle for the rear seat 135. Moreover, the string-like body 211 included in the fixing mechanism 2 may be minted in the back surface of the seat which mounts the mounting stand 1. That is, the mounting stand 1 may be tied to the seat on which the mounting stand 1 is mounted.

The other end of the extensible mechanism 21 may be directly connected to the ISOFIX anchor A, or may be connected via a connection part such as a hook. Regarding further another configuration of the fixing mechanism 2, an ISOFIX connector conforming to the ISOFIX standard may be provided at the other end of the string-like body 211, and the extensible mechanism 21 may be connected to the ISOFIX anchor A by the ISOFIX connector.

Although the vehicle test device TD in the above embodiment is an automatic driving apparatus, it is not limited to this. The vehicle test device TD according to another embodiment may be, for example, an on-vehicle exhaust gas analyzer that analyzes exhaust gas discharged from a test sample.

According to another embodiment of the mounting stand 1, the mounting part 11 and the back part 12 may be rotatably jointed to each other so that the angle formed by the bottom surface 112 and the back surface 122 can be arbitrarily changed.

According to another embodiment of the mounting stand 1, it may be configured such that a size of the bottom surface 112 of the mounting part 11 and a size of the back surface 122 of the back part 12 can be changed.

In the mounting stand 1 of the embodiment mentioned above, although the bottom surface 112 and the back surface 122 are both formed to be planar shaped, the configuration thereof is not limited to this. In another embodiment, each of these surfaces may be formed to have a curved surface shape, a surface shape simulating a human body such as a mannequin, or the like, so long as these surfaces can be in surface contact with the seating surface SS and the backrest surface RS of the driver's seat.

In the above embodiment, although the fixing mechanism 2 includes the two extensible mechanisms 21 and the other ends thereof are respectively jointed to the two left and right ISOFIX anchors A provided in the single rear seat BS, the present invention is not limited to this. According to another embodiment, the other ends of the respective two extensible mechanisms 21 may be jointed to one ISOFIX anchor. According to further another embodiment, the fixing mechanism 2 may include only one extensible mechanism 21. In this case, one end of the extensible mechanism 21 may be jointed to one of a pair of joint parts 13, the other end may be jointed to the other of the pair of joint parts 13, and an intermediate portion between the one end and the other end may be jointed to one or two ISOFIX anchors A.

Moreover, in the above embodiment, although the mounting stand 1 provided in the holding apparatus 100 is placed on the driver's seat FS and holds the vehicle test device TD, the present invention is not limited to this. According to another embodiment, the mounting stand 1 may be placed on another seat FS such as a front passenger seat, or may be placed on the rear seat BS. In the case where the vehicle test device TD is an automatic driving apparatus, the mounting stand 1 needs to be disposed on the driver's seat FS. In the case where the vehicle test device TD is an exhaust gas analyzer, it is preferable that the vehicle test device TD is disposed on the front passenger seat FS.

Figure 5:
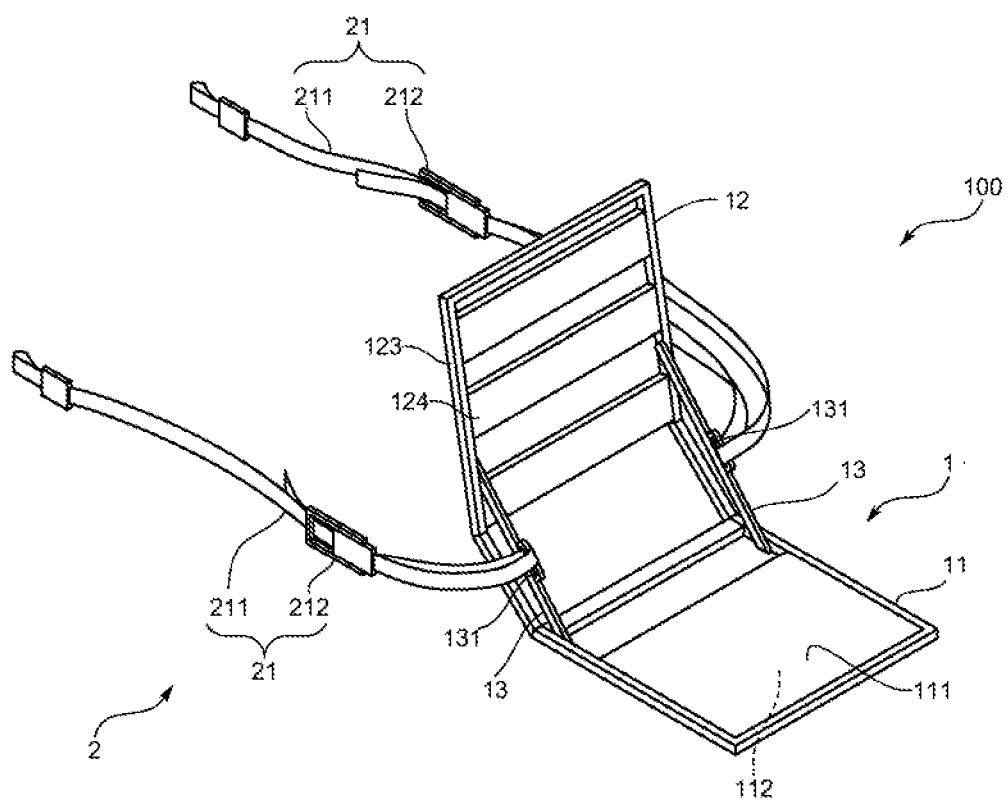
FIG. 5 is a perspective view schematically showing an entire configuration of a holding apparatus in another embodiment.

In the above embodiment, although the back part 12 of the mounting stand 1 is a sheet of plate-shaped member, it is not limited to this. The back part 12 of another embodiment may be configured of a frame 123 and a plurality of plate members 124 each of which is fixed to the frame 123, as shown in FIG. 5.

In the above embodiment, although the description is made using the completed vehicle as a specific aspect of a test sample, it is not limited to this. According to another embodiment, the test sample may be a part of the completed vehicle.

In addition, it goes without saying that the present invention is not limited to the above embodiments, and various modifications may be made without departing from the spirit of the present invention.

REFERENCE SIGNS LIST

100 . . . Holding apparatus
1 . . . Mounting stand
112 . . . Bottom surface
122 . . . Back surface
2 . . . Fixing mechanism
TD . . . Vehicle test device
FS . . . Front seat
SS . . . Seating surface
RS . . . Backrest surface
A . . . ISOFIX anchor

The invention claimed is:

1. A holding apparatus for holding a vehicle test device to be used for testing a test sample that is a vehicle or a part of the vehicle on a seat of the test sample, comprising:
   a mounting stand on which the vehicle test device is mounted; and
   a fixing mechanism configured to be connected to an ISOFIX anchor that is provided on a rear seat of the test sample to fix the mounting stand to the seat.

2. The holding apparatus according to claim 1, wherein the fixing mechanism includes an extensible mechanism having its length adjustable, and
   one end of the extensible mechanism is connected to the mounting stand, and the other end is configured to be connectable to the ISOFIX anchor.

3. The holding apparatus according to claim 1, wherein the mounting stand has a bottom surface for contacting with a seating surface of the seat and a back surface for contacting with a backrest surface of the seat, and wherein
   the bottom surface and the back surface are configured to be respectively in surface contact with the seating surface and the backrest surface.

4. The holding apparatus according to claim 3, wherein the mounting stand further comprises a joint part that joints the bottom surface and the back surface, and
   upon fixing the joint part to the ISOFIX anchor via the extensible mechanism, the bottom surface of the mounting stand is pressed against the seating surface of the seat and the back surface of the mounting stand is pressed against the backrest surface of the seat.

5. The holding apparatus according to claim 4, wherein in a state that the mounting stand is set on the seat, the joint part to which one end of the extensible mechanism is connected is positioned forward of side support portions provided on both sides of the backrest part of the seat.

6. The holding apparatus according to claim 1, wherein the vehicle test device is an automatic driving device that automatically drives the test sample or an exhaust gas analyzer that analyzes exhaust gas discharged from the test sample.

7. The holding apparatus according to claim 1, wherein the seat is a driver's seat or a front passenger seat of the test sample.

8. A method for fixing a mounting stand on which a vehicle test device to be used for testing a test sample that is a vehicle or a part of the vehicle is mounted, to a seat of the test sample, comprising:
   fixing the mounting stand to the seat using an ISOFIX anchor that is provided on a rear seat of the test sample.

9. The method for fixing the mounting stand according to claim 8, wherein the seat is a driver's seat or a front passenger seat.

10. A holding apparatus for holding a vehicle test device to be used for testing a test sample that is a vehicle or a part of the vehicle on a seat of the test sample, comprising:
   a mounting stand on which the vehicle test device is mounted; and
   a fixing mechanism including an extensible mechanism configured to be connected to an ISOFIX anchor that is provided on a rear seat of the test sample to fix the mounting stand to the seat such that the extensible mechanism extends to the rear seat and pulls the mounting stand in an obliquely downward and backward direction to press the mounting stand into a back of the seat and a bottom of the seat.

* * * * *